(12) United States Patent
Peress et al.

(10) Patent No.: US 7,224,286 B2
(45) Date of Patent: May 29, 2007

(54) SOLAR PANEL HAVING VISUAL INDICATOR

(75) Inventors: Sass M. Peress, Montreal (CA); Po K. Lau, Outremont (CA)

(73) Assignee: ICP Global Technologies, Inc., St. Laurent, Quebec (CA)

( * ) Notice: Subject to any disclaimer, the term of this patent is extended or adjusted under 35 U.S.C. 154(b) by 102 days.

(21) Appl. No.: 10/895,956

(22) Filed: Jul. 22, 2004

(65) Prior Publication Data

US 2005/0030187 A1  Feb. 10, 2005

Related U.S. Application Data

(60) Provisional application No. 60/489,084, filed on Jul. 22, 2003.

(51) Int. Cl.
*G08B 21/00* (2006.01)
*H01L 35/00* (2006.01)
*F21L 4/00* (2006.01)

(52) U.S. Cl. .......... 340/635; 340/600; 340/693.2; 340/333; 362/183; 136/206; 320/101; 320/103

(58) Field of Classification Search ........... 340/635
See application file for complete search history.

(56) References Cited

U.S. PATENT DOCUMENTS

| | | | |
|---|---|---|---|
| 4,161,180 A | 7/1979 | Tiger | |
| 4,168,124 A | 9/1979 | Pizzi | |
| 4,222,665 A | 9/1980 | Tachizawa et al. | |
| 4,384,317 A * | 5/1983 | Stackpole | 362/183 |
| 4,539,516 A | 9/1985 | Thompson | |
| 5,252,893 A * | 10/1993 | Chacham et al. | 315/200 A |
| 5,717,478 A | 2/1998 | Kulik et al. | |
| 5,782,552 A * | 7/1998 | Green et al. | 362/183 |
| 6,013,985 A * | 1/2000 | Green et al. | 315/149 |
| 6,107,998 A | 8/2000 | Kulik et al. | |
| 6,483,275 B1 | 11/2002 | Nebrigic et al. | |
| 6,486,791 B1 | 11/2002 | Crawford | |
| 6,517,307 B1 | 2/2003 | Marino | |
| 6,519,383 B1 | 2/2003 | Cannell | |
| 6,519,805 B2 | 2/2003 | Firdaus et al. | |
| 6,521,582 B2 | 2/2003 | Masschelein et al. | |
| 6,629,634 B2 | 10/2003 | Simmons | |
| 6,650,085 B2 | 11/2003 | Lau et al. | |

FOREIGN PATENT DOCUMENTS

| | | |
|---|---|---|
| JP | 1192176 | 8/1989 |
| JP | 8278354 | 10/1996 |
| WO | WO 87/00312 | 1/1987 |

* cited by examiner

*Primary Examiner*—Donnie L. Crosland
(74) *Attorney, Agent, or Firm*—Nelligan O'Brien Payne LLP

(57) ABSTRACT

A solar panel incorporating a selectively actuable energy availability indicator arrangement. The arrangement includes a visual indicator, such as an LED, and a selectively actuable button. Actuation of the button completes a circuit to read the level of energy available. A resistor in series with the LED as it is connected to the terminals of the solar panel limits the current flow through the LED. A blocking diode connected in series with a charging battery prevents the LED from reading the charge of the battery.

8 Claims, 2 Drawing Sheets

SOLAR PANEL HAVING VISUAL INDICATOR

This application claims the benefit of U.S. Provisional Application No. 60/489,084 filed Jul. 22, 2003.

FIELD OF THE INVENTION

This invention generally relates to the use of solar panels, and, more particularly, to an indicator that is used to detect whether or not electrical energy is available in such a solar panel.

BACKGROUND OF THE INVENTION

In recent years, the use of photovoltaic or solar panels for harnessing and applying the energy of the sun has greatly expanded. New technologies have increased the versatility of solar panels, thus widening the scope of their application. For example, solar panels are increasingly capable of powering devices such as vehicle battery chargers, radios, computers, and other personal electronic devices, among other things. Solar panels are frequently used in both stationary locations, such as the home or office, as well as mobile locations, such as vehicles, trailers. They are utilized both indoors and out of doors.

Inasmuch as solar panels produce electrical energy from sunlight, the provision of adequate electrical energy from the solar panel(s) to power the load device(s) is of primary concern in utilizing solar panels. Therefore, most solar powered applications incorporate a charge storage device for receiving electrical energy from a solar panel in electrical communication therewith and for providing stored power to a load circuit. Typically, the charge storage device is a battery.

It is important that the user be able to verify that the solar panel is able to provide adequate power for servicing a given load device. A panel that is unable to provide adequate power results in a system that is not sustainable; eventually, the battery will run out of power. For systems intended to be operated for short periods of time, this is not typically a concern as the battery is recharged when the system is not in operation; however, for systems employing little or no charge storage and for systems intended for use during long continuous periods of time, a panel that is unable to provide adequate power is extremely problematic.

When a solar panel is able to generate adequate power but is not doing so, relocation or reorientation of the panel to provide optimal exposure is a simple and often effective means for increasing the generated power. Orientation deficiencies and an optimal orientation of the solar panel, however, may not be apparent, for example during overcast conditions.

Alternately, the panel itself may be defective, or the coupling between the panel and the load circuit may be defective as a result of the breakage of wires inside a panel junction box, for example. If it is determined that the panel or the connections are defective, replacement may be required. Unfortunately, however, such troubleshooting of the solar panel application can be extremely time consuming and unreliable under field conditions.

Typically, verification of electrical energy available from a solar panel requires the use of external equipment, including, for example, an ammeter and a load, as well as some basic knowledge of electricity and photovoltaics. The metering equipment is coupled across the solar panels output ports to determine an amount of electrical energy generated by the panel. Unfortunately, however, it can not only be cumbersome and inconvenient to purchase and carry such equipment, for example in a consumer application. For commercial applications, in order to provide metering equipment that is easily accessible, the operator must maintain relatively expensive meters in locations where space may be at a premium. Further, operation of such testing equipment requires specialized knowledge.

As a result, it would be desirable to provide a reliable and convenient method or means of trouble shooting a solar panel.

BRIEF SUMMARY OF THE INVENTION

In accordance with the invention there is provided a circuit comprising: a solar panel comprising a first output port and a second output port; and, a power indicator electrically coupled between the first output port and the second output port for providing an indication of electrical power generated by the solar panel in response to light incident thereon.

In accordance with another embodiment of the invention there is provided a circuit comprising: a solar panel comprising a first output port and a second output port; a power indicator electrically coupled for indicating an amount of electrical power generated by the solar panel in response to light incident thereon; and, an actuator for selectively activating the power indicator circuit.

In accordance with another aspect of the invention there is provided a method of aligning a solar panel comprising: providing a visual indication of an amount of energy generated by the solar panel; and, changing at least one of location and orientation of the solar panel until the visual indication indicates one of sufficient energy being generated and a near optimal amount of generated energy.

These and other advantages of the present invention, as well as additional inventive features, will be apparent from the description of the invention provided herein. Further features and advantages of the present invention, as well as the structure and operation of various embodiments of the present invention, are described in detail below with respect to the accompanying drawings. In the drawings, like reference numerals indicate identical or functionally similar elements.

DETAILED DESCRIPTION OF THE INVENTION

Many solar powered consumer devices exist that include displays. These devices, such as calculators, include a solar panel, a charge storage device, input/output actuators, and a display. In some of these devices, illumination of the display is indicative of a presence of light energy for being converted by the solar panels into electrical energy for storage within the charge storage device. If the device is removed from the light, the displayed information slowly fades as the charge is drawn from the charge storage device. Also of note, the display on prior art devices is of a nature to be ON or OFF. The display operation may require sufficient light, but the display operation is not indicative of an amount of light incident on the solar panel.

Figure 1:
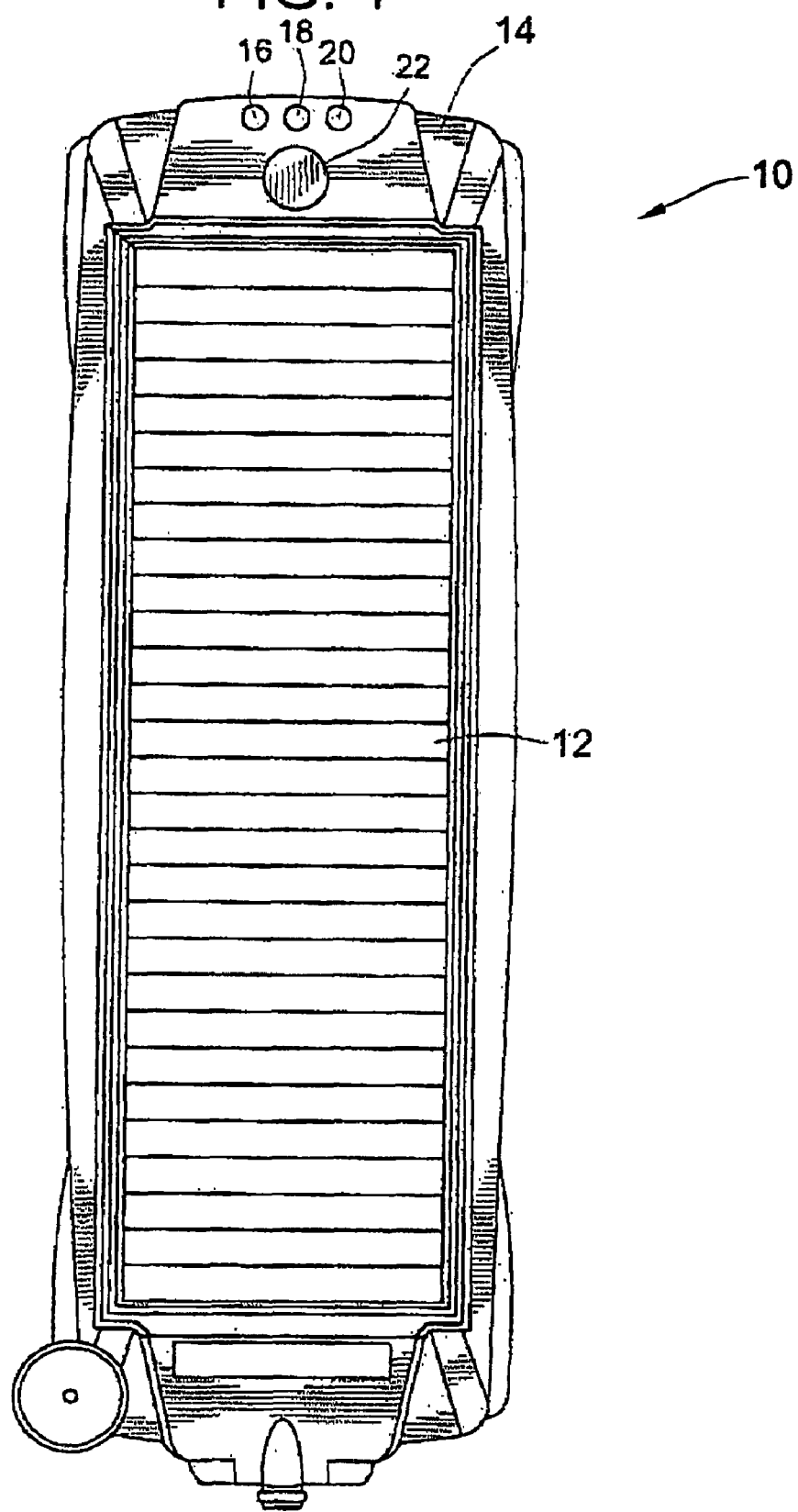
FIG. 1 is a plan view of an embodiment of a solar panel with a power indicator constructed in accordance with teachings of the invention.
Figure 2:
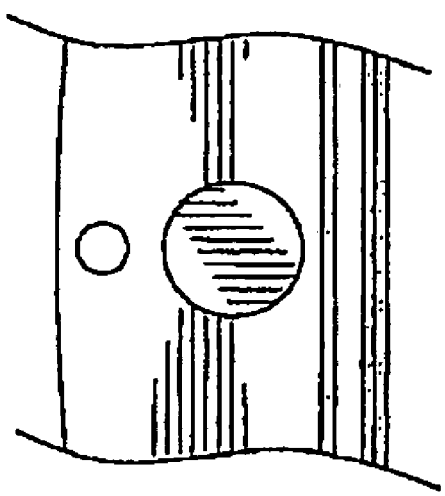
FIG. 2 is an enlarged view of an exemplary activation switch and visual indicator of the power indicator in the solar panel of FIG. 1.

Turning now to the drawings, there is shown in FIG. 1, a photovoltaic or solar panel 10 constructed in accordance with teachings of the invention. The solar panel 10 includes a centrally disposed active panel 12 supported by a frame 14. Solar panels and their support structures are well known in the art and any suitable solar panel and support structure may benefit if implemented in accordance with the present invention.

In accordance with the present invention, in order to provide the user with an indication of whether or not electrical energy is available to power a given load, the solar panel 10 further includes a power indicator 18 in the form of a visual indicator. Further, an activator 22 is provided for activating the power indicator 18.

Preferably, the power indicator 18 is coupled across the panel output ports and, is indicative of panel output power as opposed to an amount of energy stored within a charge storage device (not shown). As such, the power indicator 18 provides instant feedback relating to panel operation and panel exposure to light.

The power indicator 18 is shown in the form of an LED that will light up when the solar panel 10 is able to provide sufficient energy with a required polarity. It is immediately apparent to one of skill in the art of electronics how to install a LED for emitting light in response to proper operation of the solar panel.

The use of an LED has the additional advantage of being simple while the brightness of the LED varies depending upon the available sunlight. Optionally, the LED is of a known type. Preferably, the LED provides analogue variations in the level of light emitted therefrom in response to varying amounts of electrical energy generated by the solar panel. Standard LED designs are optionally utilized in the arrangement, although it is envisioned that any later developed LED design could also be utilized in the arrangement. The LED is a blue LED for emitting blue light. Alternatively, another form of LED, for example, white, red or green LEDs are used.

Alternatively, a meter is provided integral with the device for indicating proper operation of the solar panel and amount of energy being generated by the solar panel. For example, a plurality of circuits are arranged in parallel each for turning on a different indicator. The plurality of circuits each operate above a different amount of energy such that the indicator indicates a range of energy within the solar panel is operating, the range defined between one of the indicators that is ON and an indicator for an adjacent range that is other than ON. For example, with three indicators 16, 18, and 20 forming the power indicator it is possible to indicate low energy levels at 16, good energy levels at 18, and excellent energy levels at 20. Further, the use of different indicators allows for labeling of the indicators obviating a need for complex instructions. The use of parallel circuits allows for indicators that are binary in nature and, as such., preferably consume less power th an LED. Further, indicators each providing different indications instead of a single indicator differentiated based on brightness is more accurately interpreted by an operator in many instances.

Alternatively, the indicator is other than a visual indicator. For example, the indicator is an auditory indicator. Further alternatively, the indicator indicates a direction in which to move the panel for improved lighting.

In order to prevent the power indicator 18 from acting as a constant current draw, the power indicator 18 is selectively activated. The selective activation is provided via activation switch 22. For example, the actuator 22 is of a depression variety. The actuator 22 is selected to be of an appropriate design. To ensure that the power indicator 18 ceases operation automatically, the actuator 22 preferably activates the circuit for a limited time. For example, the activation switch is in the form of an automatic return press button. Alternatively, the actuator 22 is in the form of a button that depresses into a detent such that the user may depress the button, view the state of readiness of the panel 10, adjust the position of the panel 10 to obtain better sunlight if necessary, and then depress the button again to cease illumination of the visual indicator 18. Further alternatively, the actuator 22 initiates a timer that automatically deactivates the circuit after a known period of time.

According to the embodiment, the visual indicator is in the form of a light emitting diode (LED) that will light up if the solar panel is able to provide energy. The brightness of the LED varies depending upon the available sunlight. As a result, the user is able to optimally orient the panel to provide the brightest LED via the best access to sunlight, which may not be apparent, depending upon the weather conditions. Further, it will readily show if a structural problem exists in the panel inasmuch as the LED will not be illuminated in any manner, even in bright sunlight conditions.

The LED is activated by the depression of an activation switch. Optionally, to ensure that the LED turns off automatically, the switch is in the form of an automatic return press button. This automatic return reduces any unnecessary energy draw on the panel's power, a feature that may be significant when the panel is operated under less than ideal sunlight conditions. Moreover, this selective activation and automatic delumination provides a psychological result, reassuring the user that energy is not being wasted on unnecessary operation of the LED.

Figure 3:
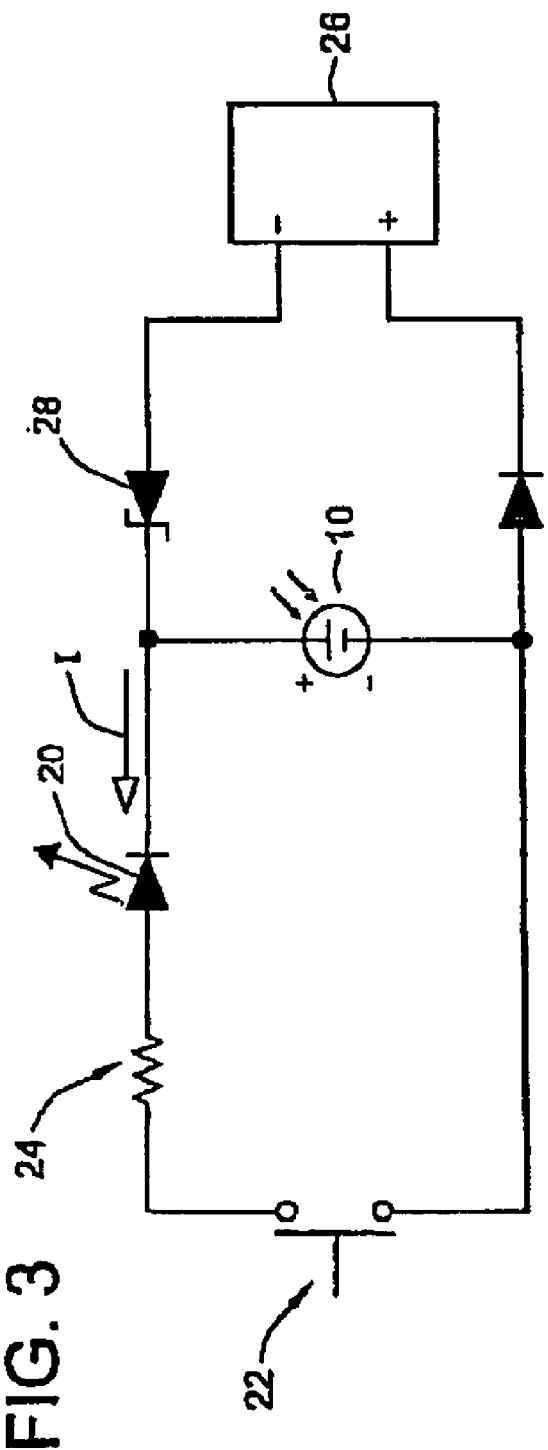
FIG. 3 is a schematic view of an arrangement for coupling the activation switch and LED of FIG. 2 to a solar panel constructed in accordance with teachings of the invention.

An exemplary schematic of a connection of power indicator 18 in the form of visual indicator 18 and the actuator 22 with the panel 10 is illustrated in FIG. 3. The visual indicator 18 and the actuator 22 are connected in series to the positive and negative terminals of the solar panel 10 such that depression of the actuator 22 completes the circuit. In order to limit the current that flows through the visual indicator 18 while providing adequate current flow to illuminate the visual indicator 18, a resistor 24 is coupled in series with the visual indicator 18. As a result of careful selection of the resistance R, the visual indicator 18 draws a small amount of current, and, therefore, the minimal use of energy produced by the solar panel 10, for providing a visual indication of the energy available.

The power indicator 18 may be utilized during both set up and usage of the solar panel 10 to ensure that near optimal energy is provided. Inasmuch as such a solar panel 10 is often used for charging a battery 26, the incorporation of a partially charged battery 26 in the circuit shown in FIG-3 results in inaccurate power availability readings if current is permitted to flow through the power indicator 18 from the battery 26. Accordingly, a blocking diode 28 is provided in series with the battery 26 such that the blocking diode 28 prohibits flow of the battery discharge through the power indicator 18 when the actuator 22 is depressed. As a result, the power indicator 18 provides information on the solar panel 10 output energy in isolation from the battery 26.

In use, the solar panel 10 is installed for operation with or without a load coupled thereto. The actuator 22 is actuated and the power indicator 18 indicates an amount of electrical power generated by the solar panel 10. The power indicator 18 indicates one of faulty operation/insufficient light or a light energy level. When necessary or desired, the panel 10 is then reoriented or resituated in order to result in sufficient electrical energy generation by the panel 10. Preferably, the power indicator 18 ceases indication automatically. Alternatively, the power indicator 18 is the switched OFF.

In an alternative method, the solar panel 10 is installed for operation with or without a load coupled thereto. The actuator 22 is actuated and the power indicator 18 indicates an amount of electrical power generated by the solar panel 10. The power indicator 18 is only operational when the actuator 22 is being actuated. The power indicator 18 indicates one of faulty operation/insufficient light or a light energy level. When necessary or desired, the panel 10 is then reoriented or resituated and then the actuator 22 is actuated to determine an effect of the reorientation or resituation on the electrical energy generated by the solar panel 10. The process is repeated in order to result in sufficient electrical energy generation by the panel 10.

Thus, the power indicator provides an integrated, reliable and convenient arrangement of trouble shooting a solar panel application. The power indicator provides a visual indication of the level of electrical energy available to power a load without the necessity of external equipment. Complete inactivity of the charge indicator, even in bright sunlight indicates that the panel itself or the leads thereto are defective. Because the user may see a visual indication of electrical availability by merely depressing an activator switch, the arrangement is easy to utilize, and requires no special training or knowledge to discern if adequate output energy is available. The arrangement utilizes known components, it is relatively economical to manufacture.

Alternatively, the solar panel and circuit includes a measurement circuit providing an accurate numerical or barcode representation of the electrical energy generated by the solar panel. For example, an amount of power is indicated to clearly show the operation and lighting conditions for the panel. With a simple review of the load's label, it should be possible to determine whether or not the solar panel position is adequate for use with the selected load. Since the measurement circuit is not always active, it can consume significant energy when in use. Alternatively, the measurement circuit remains active at all times and is designed to be relatively energy efficient.

While this invention has been described with an emphasis upon preferred embodiments, it will be obvious to those of ordinary skill in the art that variations of the preferred embodiments may be used, and it is intended that the invention can be practiced otherwise than as specifically described herein. This invention includes all modifications encompassed within the spirit and scope of the invention as defined by the following claims:

What is claimed is:

1. A circuit comprising:
   (i) a solar panel comprising a first output port and a second output port;
   (ii) a charge storage device electrically coupled between the first output port and the second output port for storing energy converted by the solar panel;
   (iii) a power indicator electrically coupled between the first output port and the second output port and being in parallel with the charge storage device for providing an indication of electrical power generated by the solar panel in response to light incident thereon;
   (iv) an actuator connected in series with the power indicator for selectively activating the power indicator; and
   (v) an isolator circuit connected in series with the charge storage device for prohibiting current flows discharging from the charging storage device through to the power indicator or charging from the solar panel to the charge storage device while the power indicator is activated by the actuator.

2. A circuit according to claim 1, wherein the power indicator comprises a visual indicator and a resistor coupled in series, wherein the resistor is for limiting current drawn to the visual indicator from the solar panel.

3. A circuit according to claim 2, wherein the visual indicator comprises an LED.

4. A circuit according to claim 2, wherein the visual indicator comprises a plurality of indicator circuits each for resulting in visual indication indicative of a different range of energy converted by the solar panel.

5. A circuit according to claim 4, wherein the plurality of indicator circuits each comprises an LED.

6. A circuit according to claim 1, wherein the power indicator includes circuitry for measuring the electrical energy converted by the solar panel.

7. A circuit according to claim 1, wherein the circuit is enclosed within a same housing.

8. A circuit according to claim 1, wherein the indicator includes an audible indication.

* * * * *